United States Patent [19]

Kawata

[11] Patent Number: 4,670,838
[45] Date of Patent: Jun. 2, 1987

[54] SINGLE CHIP MICROCOMPUTER CAPABLE OF DEBUGGING AN EXTERNAL PROGRAM WITHOUT AN INCREASE OF THE NUMBER OF TERMINALS/PORTS

[75] Inventor: Kazuhide Kawata, Tokyo, Japan
[73] Assignee: NEC Corporation, Tokyo, Japan
[21] Appl. No.: 578,348
[22] Filed: Feb. 9, 1984
[30] Foreign Application Priority Data Feb. 9, 1983 [JP] Japan .................................. 58-20125

[51] Int. Cl.[4] ............................................ G06F 11/00
[52] U.S. Cl. .................................................. 364/200
[58] Field of Search ... 364/200 MS File, 900 MS File

[56] References Cited

U.S. PATENT DOCUMENTS

| 4,041,473 | 8/1977 | Bardotti et al. | 364/200 |
| 4,128,873 | 12/1978 | Lamiaux | 364/200 |
| 4,346,452 | 8/1982 | Groves | 364/900 |
| 4,449,202 | 5/1984 | Knapp et al. | 364/900 |

Primary Examiner—Gareth D. Shaw
Assistant Examiner—Daniel K. Dorsey
Attorney, Agent, or Firm—Sughrue, Mion, Zinn, Macpeak & Seas

[57] ABSTRACT

A single chip microcomputer responsive to internal and external instructions in normal and debug modes, respectively, comprises a program counter and first, second, third, and fourth port groups in both of the normal and the debug modes. The first through the fourth port groups are operable in the normal mode to process each internal instruction. Master and slave modes are defined in the debug mode to selectively change operations of the first through the fourth port groups by the use of port controllers to process each external instruction. The master mode is specified by using the first and the second groups as an instruction input port group for each external instruction and as a transfer bus for data related to each external instruction, respectively. In contrast, the third and the fourth port groups are used as an instruction input port group and a transfer bus, respectively. The master and the slave modes are indicated through a single terminal used in the normal mode. The program counter may be left unused in the debug mode. A pair of the microcomputers are connected to each other together with an external device for each external instruction, so as to carry out a debug operation. The debug operation can be voluntarily interrupted and stepwise advanced by the use of a specific instruction representative of jump to present address.

3 Claims, 8 Drawing Figures

SINGLE CHIP MICROCOMPUTER CAPABLE OF DEBUGGING AN EXTERNAL PROGRAM WITHOUT AN INCREASE OF THE NUMBER OF TERMINALS/PORTS

BACKGROUND OF THE INVENTION

This invention relates to a single chip microcomputer comprising a program memory which stores a program consisting of a succession of instructions and to a method of debugging a program stored in such a single chip microcomputer by combining the microcomputer with an external device.

In general, a recent remarkable development of a semiconductor integration technique has enabled the advent of the single chip microcomputer. The single chip microcomputer has a single semiconductor chip comprising a central processing unit (CPU), a program memory storing a program, a random access memory (RAM), and the like and has been widely used in various fields. The program memory is formed by a read-only memory (ROM) in the single chip microcomputer.

Inasmuch as the program is stored in the read-only memory in the single chip microcomputer, it is difficult to voluntarily change the program stored in the program memory and to develop a new program by the use of the same single chip microcomputer. An evaluation chip which comprises no program memory, has therefore been used to develop a new program. Such an evaluation chip is operated in response to the new program supplied from an external device.

It is to be noted here that an extremely small number of evaluation chips are manufactured in comparison with single chip microcomputers operable in accordance with the new program developed by the use of the evaluation chips despite the fact that as much labor and time should be expended in manufacturing the evaluation chips as in manufacturing the single chip microcomputers. This is extremely inconvenient for a chip manufacturer.

Various requirements have often been offered to the single chip microcomputers by users or customers after completion of the evaluation chips. Under the circumstances, each evaluation chip itself should be modified in order to satisfy such requirements. Thus, it is difficult to easily respond to a technical development and users' requirements when an evaluation chip is used to develop a new program.

A specific one of the conventional single chip microcomputers is selectively operable in accordance with an internal program stored in the program memory and an external program supplied from an external device. For convenience of description, operation based on the internal and the external programs will be called a normal and a debug mode, respectively. With such a specific single chip microcomputer, it is unnecessary to individually develop an evaluation chip.

It is to be mentioned here that the specific single chip microcomputer inevitably comprises an external instruction terminal set for the external program and an indication terminal for indicating whether either the internal or the external program is used. The external instruction terminal set is used only in the debug mode and become unnecessary in the normal mode once the new program is completed and stored into the program memory. On the other hand, the number of terminals is subjected to a strict restriction in a single chip microcomputer. Therefore, the specific single chip microcomputer is insufficient in availability to terminals in the normal mode because of presence of extra terminals, such as the external instruction terminal set.

SUMMARY OF THE INVENTION

It is an object of this invention to provide a single chip microcomputer which is selectively operable in a normal and a debug mode.

It is another object of this invention to provide a single chip microcomputer of the type described which can reduce the number of extra terminals used only in the debug mode.

It is a further object of this invention to provide a method of debugging an object program by the use of a single chip microcomputer of the type described.

A single chip microcomputer to which this invention is applicable is selectively operable in a normal and a debug mode in response to internal and external instructions, respectively. The external instructions are given from at least one external device. The microcomputer comprises a program memory for storage of a program consisting of the internal instructions, principal mode signal producing means for selectively producing a normal and a debug mode signal representative of the normal and the debug modes, respectively, a predetermined number of port groups comprising a first, a second, a third, and a fourth group of ports, and processing means coupled to the program memory, the mode signal producing means, and the port groups and responsive to the normal mode signal and the debug mode signal for processing the internal instructions produced by the program memory and the external instructions, respectively. According to this invention, the microcomputer comprises subsidiary mode signal producing means coupled to the principal mode signal producing means for producing a first and a second subsidiary mode signal representative of first and second subsidiary modes, respectively, only when supplied with the debug mode signal. The processing means comprises decoding means coupled to the program memory and the principal and the subsidiary mode signal producing means for decoding the external instructions to produce a first and a second set of control signals in response to the first and the second subsidiary mode signals, respectively, and for decoding the internal instructions produced by the program memory to produce a third set of control signals when supplied with the normal mode signal, selectively operable port control means between the first through the fourth groups of ports and the decoding means for putting the first through the fourth groups of ports into operation in the normal mode in response to the third-set control signals, for allotting, in response to the first-set control signals, the external instructions and a specific one of data sets related to the external instructions to the first and the second groups of ports, respectively, and for allotting, in response to the second-set control signals, the external instructions and a particular one of the data sets to the third and the fourth groups of ports, respectively.

DESCRIPTION OF THE PREFERRED EMBODIMENTS

Figure 1:
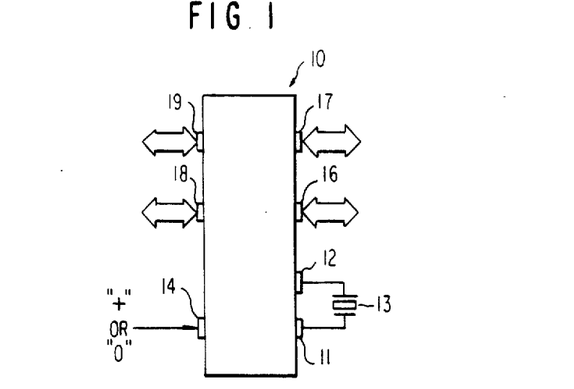
FIG. 1 shows a block diagram of a single chip microcomputer according to a first embodiment of this invention for use in describing a normal mode of operation of the microcomputer.

Referring to FIG. 1, a single chip microcomputer 10 according to a first embodiment of this invention is put into operation in a normal mode in accordance with a succession of internal instructions stored therein, as will presently be described. The internal instructions form an internal program. The illustrated microcomputer 10 is selectively operable in a debug mode in which the microcomputer 10 carries out operations in accordance with a succession of external instructions produced by an external device (not herein shown). It should be noted here that, in the debug mode, the microcomputer 10 is also selectively operable in first and second subsidiary modes which will be called master and slave modes, respectively, depending on the circumstances. The master and the slave modes serve to debug or evaluate an external program consisting of a succession of the external instructions by the use of a pair of single chip microcomputers illustrated in FIG. 1, as will later be described in detail. It may be understood for the time being that, in the debug mode, one of the single chip microcomputers is operated in the master mode while the other is operated in the slave mode and that operation of the single chip microcomputer pair in the debug mode is substantially equivalent to the operation which each single chip microcomputer carries out in the normal mode.

The illustrated microcomputer 10 has first and second input terminals 11 and 12 between which a resonator 13 which may be, for example, a crystal resonator is connected during a normal mode period. The first and the second input terminals 11 and 12 are disconnected in the debug mode from the resonator 13. Especially, the first input terminal 11 serves to indicate either a first or a second subsidiary mode, as will later be described.

The microcomputer has a level signal terminal 14 given a level signal having three levels, namely, a plus level (+), a zero level (0), and a minus level (−). When the level signal takes either the plus or the zero level (+) or (0), the microcomputer 10 is put into the normal mode. When the minus level (−) is given to the level signal terminal 14, the microcomputer 10 is put into the debug mode. Thus, the level signal terminal 14 serves to indicate either the normal or the debug mode. In addition, the microcomputer 10 is reset when the level signal terminal 14 is given the zero level (0). The level signal terminal 14 may therefore be referred to also as a reset terminal.

The microcomputer further has first, second, third, and fourth groups 10, 17, 18, and 19 of ports. Each port group comprises a plurality of ports/terminals and serves as input and/or output ports in the normal mode.

Figure 2:
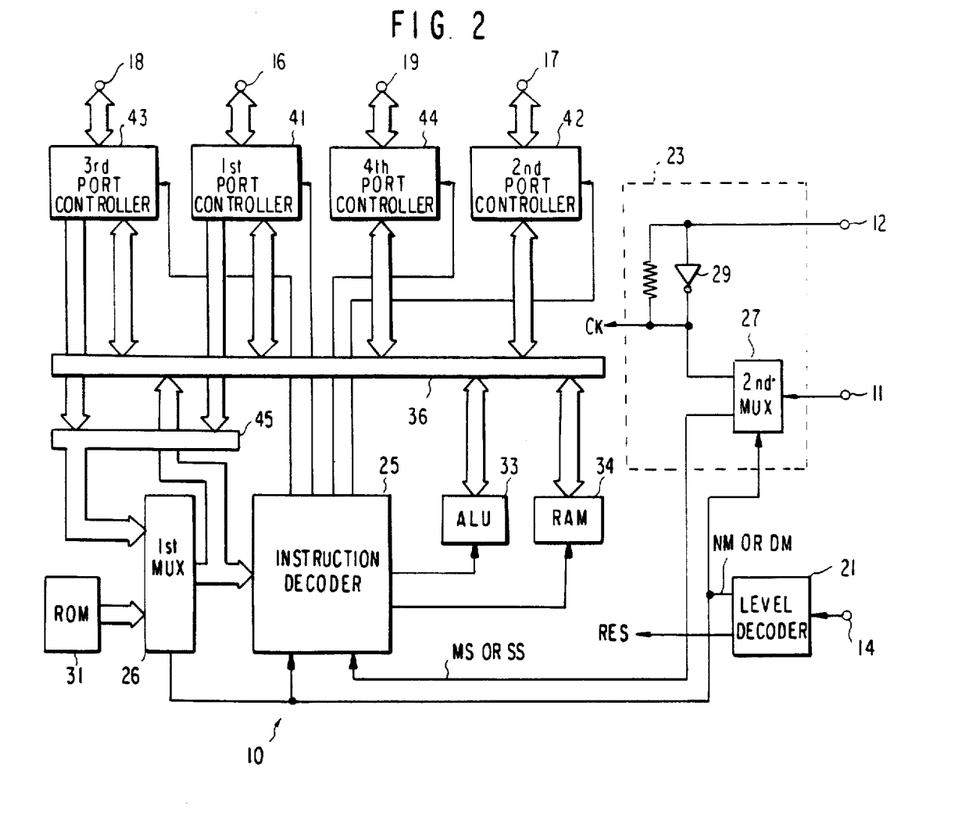
FIG. 2 shows a block diagram for use in describing the operation of the microcomputer illustrated in FIG. 1.

Referring to FIG. 2, the single chip microcomputer 10 comprises a level decoder 21 connected to the level signal terminal 14 for decoding the level signal of three levels to selectively produce a primary or principal mode signal which is selectively switched between normal and debug mode signals NM and DM representative of the normal and the debug modes, respectively. The normal mode signal NM is produced in response to either the plus or the zero level of the level signal while the debug mode signal DM is produced in response to the minus level of the level signal. Thus, the level decoder 21 may be called a primary or principal mode signal producing circuit. The level decoder 21 also produces a reset signal RES when the level signal takes the zero level. The reset signal RES resets the microcomputer 10 into an initial state of the normal mode.

Each of the normal and the debug mode signals NM and DM is delivered from the level decoder 21 to a clock distributor 23, an instruction decoder 25, and a first multiplexer 20. The clock distributor 23 comprises a second multiplexer 27 connected to the first input terminal 11 and the level decoder 21. An inverter 22 is interposed between the second input terminal 12 and the second multiplexer 27. When the normal mode signal NM is given from the level decoder 21 to the second multiplexer 27, the second multiplexer 27 connects the first input terminal 11 to the inverter 29. On the other hand, the second multiplexer 27 connects the first input terminal 11 to the instruction decoder 25 in response to the debug mode signal DM.

In the debug mode, the illustrated microcomputer 10 is selectively put into the master and the slave modes as mentioned before. More particularly, the master and the slave modes can be specified by a low and a high level, respectively, which are selectively given to the first input terminal 11 in a manner to be described later. The low and the high levels are therefore called master and slave mode signals MS and SS representative of the master and the slave modes, respectively. The master and the slave mode signals MS and SS are selectively sent from the first input terminal 11 through the second multiplexer 27 to the instruction decoder 25. The second multiplexer 27 is operable to produce the master and the slave mode signals in response to the debug mode signal DM.

Thus, the instruction decoder 25 is supplied with either the normal or the debug mode signal NM or DM. In addition, the instruction decoder 25 is also supplied with either the master or the slave mode signal MS or SS when given the debug mode signal DM. The instruction decoder 25 decodes the external instructions to produce first and second sets of control signals in response to the master and the slave mode signals MS and SS, respectively, when supplied with the debug mode signal DM. Likewise, the instruction decoder 25 decodes the internal instructions to produce a third set of control signals in response to the normal mode signal when supplied with the normal mode signal NM.

In FIGS. 1 and 2, let the microcomputer 10 be operated in the normal mode. In this event, the resonator 13 is connected between the first and the second input terminals 11 and 12, as shown in FIG. 1. The normal mode signal NM is given from the level decoder 21 to the first and the second multiplexers 26 and 27 and to the instruction decoder 25. Under the circumstances, a read-only memory (ROM) 31 is connected through the first multiplexer 26 to the instruction decoder 25. The read-only memory 31 stores the internal instructions and supplies each internal instruction to the instruction decoder 25 in the normal mode. Inasmuch as the second multiplexer 27 connects the first input terminal 11 to the inverter 29 as mentioned before, a clock pulse sequence is generated by the clock distributor 23 and is delivered to various parts of the microcomputer 10 as a sequence of internal clock pulses CK in a known manner.

Responsive to the normal mode signal NM and each internal instruction supplied from the read-only memory 31 in synchronism with the internal clock pulse sequence CK, the instruction decoder 25 decodes each internal instruction to produce the third-set control signals. A first part of the third-set control signals is delivered to an arithmetic logic unit (ALU) 33 and a random access memory (RAM) 34, both of which are well known in the art and which are coupled to an internal data bus 36. A second part of the third-set control signals is sent to first, second, third, and fourth port controllers 41, 42, 43, and 44 which are coupled to the internal data bus 36 and also to the first through the fourth port groups 16 to 19, respectively. Supplied with the second part of the third-set control signals, the first through the fourth port controllers 41 to 44 put the first through the fourth port groups 16 to 19 into operation in the normal mode. Specifically, each of the first through the fourth port groups 41 to 44 is operable as input/output ports in the normal mode. A set of data which is related to each internal instruction is transferred through the first through the fourth port groups 41 to 44. In the example being illustrated, the first and the third port controllers 41 and 43 are further coupled to the first multiplexer 26 through an address/instruction bus 45. This means that the first and the third port controllers 41 and 43 can transfer each of the external instructions in the debug mode, as will become clear as the description proceeds. Combinations of the first through the fourth port groups 16 to 19 and the respective port controllers may be referred to as first through fourth circuit members having first through fourth operations in the normal mode, respectively.

In FIG. 2, let the microcomputer be put into the debug mode. In this event, the resonator 13 (FIG. 1) is disconnected from the first and the second input terminals 11 and 12. Instead, the first input terminal 11 is given either the master or the slave mode signal MS or SS specified by the low or high level. At first, let the master mode signal MS be given to the first input terminal 11. In the debug mode, the microcomputer 10 is oeprable in response to a succession of external synchronization pulses supplied through the second input terminal 12 from the external device. In addition, the read-only memory 31 is disconnected from the instruction decoder 25 by the first multiplexer 26 supplied with the debug mode signal DM.

Under the circumstances, the master mode signal MS is sent through the first input terminal 11 and the second multiplexer 27 to the instruction decoder 25. The instruction decoder 25 is operated in the master mode to produce the first-set control signal as described before, when supplied with both of the debug mode signal DM and the master mode signal MS. The first-set control signals are delivered to the arithmetic logic unit 33, the random access memory 34, and the first through the fourth port controllers 41 to 44. The first-set control signals may be delivered to the other parts of the microcomputer 10 like the third-set control signals.

Responsive to a first one of the first-set control signals, the first port controller 41 makes the first port group 16 serve as an instruction input port group which can respond to each external instruction. As a result, each external instruction is supplied to the instruction decoder 25 through the first input port 16, the first port controller 41, the address/instruction bus 45, and the first multiplexer 26.

Inasmuch as the first port group 10 is used as the instruction input port group in the master mode, any data can not be delivered through the first port group 16. In contrast to the master mode, the data may be transferred through the first port group 16 in the normal mode in accordance with the internal instructions. It is necessary that a combination of microcomputers can carry out, in the debug mode, operation similar to the normal mode of a sole microcomputer illustrated with reference to FIGS. 1 and 2.

Taking the above into consideration, the first port controller 41 prohibits transfer of data through the first port group 16 in the master mode even when the external instructions are indicative of transfer of data through the first port group 41. Instead, data to be transferred through the first port group 41 are sent through the second port group 42 in the master mode under control of the instruction decoder 25.

For this purpose, the second port controller 42 puts the second port group 17 into operation as an external data bus in response to a second one of the first-set control signals. Such an external bus serves to transfer data allotted to both of the first and the second port groups 10 and 17 in the master mode. It is readily possible to make the second port group 17 serve as the external data bus by controlling the second one of the first-set control signals in consideration of transfer of data in the normal mode.

At any rate, the first and the second circuit members each of which is a combination of a port group and a port controller change the first and the second operations to fifth and sixth operations for processing each external instruction.

The third and the fourth port controllers 43 and 44 operate the third and the fourth port groups 18 and 19 in the master mode in a manner similar to the normal mode. In other words, the third and the fourth operations allotted to the third and the fourth circuit members are kept unchanged in the master mode.

Let the slave mode signal SS be given to the first input terminal 11 with the debug mode signal DM produced by the level decoder 21. Responsive to the slave mode signal SS and the debug mode signal DM, the instruction decoder 25 is put into the slave mode and disconnected from the read-only memory 31 by the first multiplexer 26. Responsive to the slave mode signal SS, the instruction decoder 25 delivers the second set control signals to the first through the fourth port controllers 41 to 44 and to the arithmetic logic unit 33 and the random access memory 34.

It should be noted that the instruction decoder 25 prohibits the arithmetic logic unit 33 and the random access memory 34 from supplying any data to the internal data bus 36.

Supplied with a first one of the second-set control signals, the third port controller 43 puts the third port group 18 into operation as an instruction input port group for each external instruction, as is the case with the first port group 16 operated in the master mode. Responsive to a second one of the second-set control signals, the fourth port controller 44 makes the fourth port group serve as an external data bus in the slave mode. The first and the second port groups 16 and 17 are put into operation as input/output groups, like in the normal mode. Thus, the third and the fourth operations allotted to the third and the fourth circuit members are changed to seventh and eighth operations for processing each external instruction during the slave mode. On the other hand, the first and the second operations are kept unchanged during the slave mode.

It is readily understood from the above that the first through the fourth port groups 16 to 19 are complementarily used in the master and the slave modes. The slave mode is for compensating for operation which is allotted to the first and the second port groups 16 and 17 in the master mode and which is left out in the master mode.

In the slave mode, each external instruction is supplied to the instruction decoder 25 through the third port group 18, the third port controller 43, the address-/instruction bus 45, and the first multiplexer 26. The instruction decoder 25 becomes active to distribute the second-set control signals only when each external instruction puts either the first or the second port group 16 or 17 into operation. Otherwise, the instruction decoder 25 is kept inactive. In addition, the instruction decoder 25 operates the first, the second, and the fourth port controllers 41, 42, and 44 during an active duration in accordance with each external instruction given through the third port group 18. More particularly, data are sent through the second port group 17 and the internal data bus 36 to the fourth port group 19 when an external instruction is for receiving the data from the second port group 17. When an external instruction is for supplying data to the second port group 17, the data in question are transferred from the fourth port group 19 to the second port group 17. Likewise, when an external instruction is for receiving data from the first port group 16 or for supplying data to the first port group 16, the data are transferred between the first and the fourth port groups 16 and 19. In other words, the first and the second port groups 16 and 17 are operated as input/output port groups inherent thereto in the normal mode. Thus, the fourth port group 19 in the slave mode serves as the external data bus and is connected to the second port group 17 of another microcomputer operated in the master mode as will later become clear.

It is readily understood that the instruction decoder 25 allots data to the second port group 17 in response to the master mode signal MS even when each external instruction is given through the first port group 16 to indicate operation of the first port group 16. Further, the instruction decoder 25 couples the fourth port group 10 to the first and the second port groups 16 and 17 in response to the slave mode signal SS in carrying out transmission of data between the fourth port group 19 and each of the first and the second port groups only when each external instruction is given through the third port group 18 to indicate operation of the first and the second port groups 16 and 17.

Figure 3:
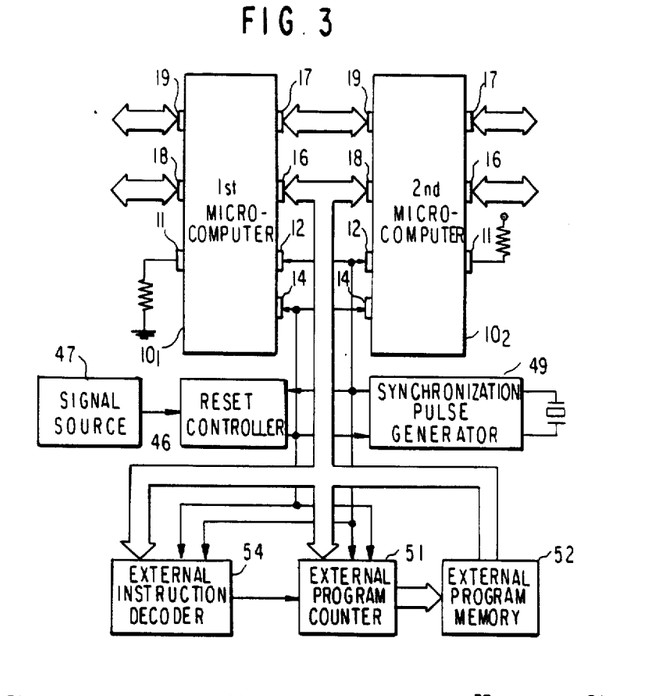
FIG. 3 shows a block diagram for use in describing a debugging method carried out by the use of a pair of microcomputers each of which is similar to that illustrated in FIG. 2.

Referring to FIG. 3 afresh together with FIG. 2, description will be made about a method of debugging an external or object program in combination with an external device. In this method, use is made of first and second single chip microcomputers (depicted at $10_1$ and $10_2$) operable in the debug mode. Each of the first and the second single chip microcomputers $10_1$ and $10_2$ is identical with that illustrated with reference to FIGS. 1 and 2, although terminals and port groups are somewhat changed in positions from those in FIG. 1 merely for convenience of illustration. Therefore, each microcomputer comprises similar terminals and ports designated by like reference numerals.

In FIG. 3, the first input terminal 11 of the first microcomputer $10_1$ is grounded through a resistor (unnumbered) to be kept at the low level. The first microcomputer $10_1$ is therefore operable in the master mode described in conjunction with FIG. 2. On the other hand, the first input terminal 11 of the second microcomputer $10_2$ is supplied with the high level from a power source (not shown) to put the second microcomputer $10_2$ in the slave mode. The second input terminals 12 of the respective microcomputers $10_1$ and $10_2$ are connected in common to a reset controller 46 supplied with a plus or a zero level from a signal source 47. The level signal terminals 14 of the first and the second microcomputers $10_1$ and $10_2$ are connected to a synchronization pulse generator 49 cooperating with the reset controller 46 in a manner to be later described.

The second port group 17 of the first microcomputer $10_1$ is connected to the fourth port group 19 of the second microcomputer $10_2$. Both of the above-mentioned ports serve as the external data buses in the master and the slave modes, respectively as described in conjunction with FIG. 2. The first and the third port groups 16 and 18 of the first and the second microcomputers $10_1$ and $10_2$ are operable as the instruction input ports in the master and the slave modes, respectively, and are connected to an external program counter 51 and an external program memory 52 which stores the external program to be debugged. Inasmuch as each read-only memory 31 (FIG. 2) of the first and the second microcomputers $10_1$ and $10_2$ is disconnected from each instruction decoder 25 in the debug mode as mentioned before, each of the first and the second microcomputers $10_1$ and $10_2$ is operated in accordance with the external instructions supplied from the external program memory 52.

In FIG. 3, the external program counter 51 is used for specifying each address of the external program memory 52, instead of an internal program counter (omitted from FIG. 2) included in each microcomputer.

Let a branch or a jump instruction be produced from the external program memory 52 as one of the external instructions. In this event, the external program counter 51 per se can not change an address in response to such a jump instruction, because the external program counter 51 successively counts each external instruction. Taking this into account, an external instruction decoder 54 is coupled to the external program memory 52 and the external program memory 51 so as to decode the branch instruction, the jump instruction, and the like and to change an address counted by the external program counter 51. Thus, the external instruction decoder 54 serves to interpret each of counter operating instructions, tions, such as the branch instruction. The external instruction decoder 54 is readily constructed by the use of a known technique.

As shown in FIG. 3, the external device comprises the reset controller 46, the signal source 47, the synchronization pulse generator 49, the external program counter 51, the external program memory 52, and the external instruction decoder 54.

The third and the fourth port groups 18 and 19 of the first microcomputer $10_1$ are coupled to a test device (not shown) together with the first and the second port groups 16 and 17 of the second microcomputer $10_2$. A combination of the first and the second microcomputers $10_1$ and $10_2$ has the first through the fourth port groups to be connected to the test device, as is the case with each one of the first and the second microcomputers $10_1$ and $10_2$. This means that operation of each microcomputer can be simulated by the combination of the first and the second microcomputers.

In operation, the reset controller 46 produces the zero level as the level signal in response to the zero level given from the signal source 47. Each microcomputer $10_1$ and $10_2$ is reset into an initial state when the zero level is supplied to each level signal terminal 14 of the first and the second microcomputers $10_1$ and $10_2$ as described in connection with FIG. 2. Thereafter, the reset controller 46 is given the plus level from the signal source 47 and delivers the minus level $(-)$ as the level signal to each level signal terminal 14 of the first and the second microcomputers $10_1$ and $10_2$ in timed relation to one of the synchronization pulses given from the synchronization pulse generator 49. As a result, the first and the second microcomputers $10_1$ and $10_2$ are put into the debug mode.

In the example being illustrated, the first and the second microcomputers $10_1$ and $10_2$ are operable in the master and the slave modes, respectively, as mentioned before. In addition, both microcomputers $10_1$ and $10_2$ are synchronized with each other in response to the synchronization pulses given from the synchronization pulse generator 49 to the respective second input terminals 12.

The external program counter 51 is counted in response to the synchronization pulses to successively specify each of the addresses of the external program memory 52. The external program memory 52 reads the external instructions out of the addresses specified by the external program counter 52. The external instructions read out of the external program memory 52 are delivered to the external instruction decoder 54 and to the first and the third port groups 16 and 18.

As described heretobefore, the instruction decoder of the second microcomputer $10_2$ is for putting the first and the second port groups 16 and 17 into operation in response to the external instructions supplied from the third port group 18. The instruction decoder of the first microcomputer $10_1$ is operable to allot data to the second port group 17 even when the data are to be sent through the first port group 16. Under the circumstances, each data set related to the external instructions is distributed to the first and the second port groups 16 and 17 of the second microcomputer $10_2$ and to the third and the fourth port groups 18 and 19. Such distribution of each data set is similar to the case where each microcomputer is put into the normal mode. For example, let a particular one of the external instructions be for giving data to the first port group 16 of one of microcomputers $10_1$ and $10_2$. The particular external instruction is executed in each of the microcomputers $10_1$ and $10_2$. The data related to the particular external instruction are produced in the first microcomputer $10_1$ to be allotted to the second port group 17 of the first microcomputer $10_1$ and are sent to the fourth port group 19 of the second microcomputer $10_2$. The data sent from the first microcomputer $10_1$ are further allotted to the first port group 16 of the second microcomputer $10_2$.

Let another one of the external instructions be for supplying data from the first port group 16 of one of microcomputers $10_1$ and $10_2$ to the random access memory 34 (FIG. 2). In this event, the data given to the first port group 16 of the second microcomputer $10_2$ are allotted to the fourth port group 19 of the second microcomputer $10_2$ to be sent to the second port group 17 of the first microcomputer $10_1$. The data are thereafter stored in the random access memory 34 of the first microcomputer $10_1$.

As readily understood from the above, every one of the terminals 11, 12, and 14 and the first through the fourth port groups 16 to 19 is used not only in the normal mode but also in the debug mode. In other words, none of extra terminals and port groups are necessary in each of the first and the second microcomputers $10_1$ and $10_2$. Consequently, all of the terminals and the port groups can effectively be used in each of the normal and the debug modes.

Figure 4:
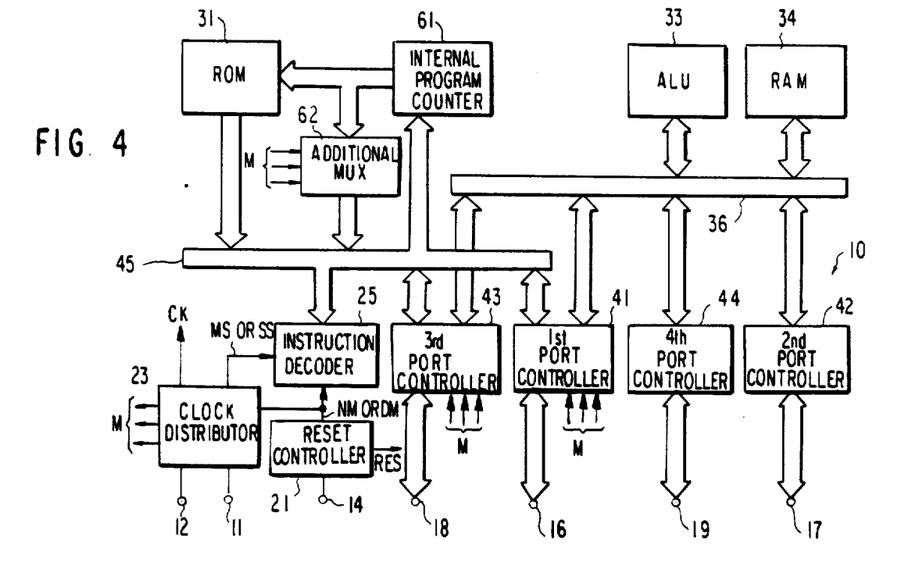
FIG. 4 shows a block diagram of a single chip microcomputer according to a second embodiment of this invention.

Referring to FIG. 4, a single chip microcomputer 10 according to a second embodiment of this invention comprises similar parts designated by like reference numerals and can carry out debug operation without the external program counter 51 (FIG. 3) and the external instruction decoder 54 when combined with another microcomputer, like in FIG. 3. For this purpose, each of the first through the fourth port controllers 41 to 44 is put into operation in a time division fashion.

In FIG. 4, an internal program counter is explicitly indicated at 61 and is coupled to the read-only memory 31. The internal program counter 61 can produce a succession of address signals in both of the normal and the debug modes. Stated otherwise, the illustrated internal program counter 61 is used not only in the normal mode but also in the debug mode. Each of the address signals specifies each address of the read-only memory 31 in the normal mode and each address of an external program memory shown at 52 in FIG. 3. The read-only memory 31 is coupled to the instruction decoder 25 only in the normal mode and is disconnected from the instruction decoder 25 in the debug mode, like in FIG. 3. Therefore, the instruction decoder 25 is put into operation in response to the internal instructions in the normal mode.

In the debug mode, the address signals are sent to an additional multiplexer 62 coupled to the address/instruction bus 45. The additional multiplexer 62 is controlled by the clock distributor 23. In order to control the additional multiplexer 62, the illustrated clock distributor 23 can produce first, second, and third control pulses $M_1$, $M_2$, and $M_3$ (collectively depicted at M in FIG. 4) in addition to the internal clock pulses CK and the master and the slave mode signals MS and SS. Although not depicted in detail, such a clock distributor 23 may comprise a counter circuit for counting the internal clock pulses CK in addition to the second multiplexer 27 (FIG. 2).

The first through the third control pulses $M_1$ to $M_3$ are for putting the additional multiplexer 61 and the first and the third port controllers 41 and 43 into operation in a time division fashion as will presently be described.

Figure 5:
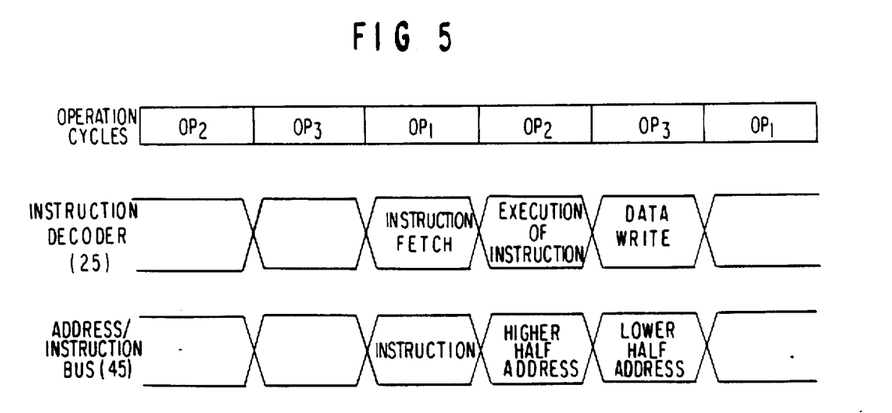
FIG. 5 shows a time chart for use in describing the operation of the microcomputer illustrated in FIG. 4.

Temporarily referring to FIG. 5, the instruction decoder 25 processes each external instruction in the debug mode through first, second, and third operation cycles OP$_1$, OP$_2$, and OP$_3$ which are successively and repeatedly carried out in the instruction decoder 25. The first through the third control pulses M$_1$, M$_2$, and M$_3$ are made to correspond to the first through the third operation cycles OP$_1$ to OP$_3$ respectively. More specifically, a succession of the first control pulses M$_1$ is produced in timed relation to the first operation cycle OP$_1$ to define a first succession of time intervals. Each of the first control pulses M$_1$ is produced by the clock distributor 23 at a predetermined period determined by an instruction cycle of the microcomputer. The second and the third control pulses M$_2$ and M$_3$ are produced between two adjacent ones of the first control pulses M$_1$ in timed relation to the second and the third operation cycles, respectively, to define a second succession of time intervals. As will later become clear, the first and the second successions of time intervals are allotted to the external instructions and the address signals, respectively.

Referring to FIG. 4 again together with FIG. 5, the instruction decoder 25 in the debug mode fetches each external instruction during the first operation cycle OP$_1$ through either the first or the third port group 16 or 18 and the address/instruction bus 45. Accordingly, the address/instruction bus 45 is used for each external instruction during the first operation cycle OP$_1$. During the second operation cycle OP$_2$, each external instruction is executed by the instruction decoder 25. Although the internal data bus 36 is used during the second operation cycle OP$_2$, the address/instruction bus 45 is empty or unused along with the first and the third port groups 16 and 18. This means that the first and the third port groups 16 and 18 can be used for another object during the second operation cycle OP$_2$. The instruction decoder 25 writes data related to each external instruction in a memory, such as the random access memory, registers, or the like, during the third operation cycle OP$_3$ in accordance with each external instruction. In this event, the address/instruction bus 45 and both of the first and the third port groups 16 and 18 are empty as in the second operation cycle OP$_3$, although the internal data bus 36 is used. Accordingly, the first and the third port groups 16 and 18 can also be used for another object during the third operation cycle OP$_3$. In the example being illustrated, higher and lower significant halves of bits of each address signal are sent from the internal program counter 61 through the additional multiplexer 62 to either the first port group 16 or the third port group 18 during the second and the third operation cycles OP$_2$ and OP$_3$.

Let the microcomputer 10 be in the master mode in which each external instruction is sent through the first port group 16, as described in conjunction with FIGS. 2 and 3. The clock distributor 23 delivers one of the first control pulses M$_1$ to the additional multiplexer 62 and to the first through the fourth port controllers 41 to 44. Responsive to each first control pulse M$_1$, the additional multiplexer 62 intercepts the address signals supplied from the internal program counter 61. As a result, no address signal is given to the address/instruction bus 45. On the other hand, the first port controller 41 is enabled during the master mode by the one first control pulse M$_1$ to allow each external instruction to pass therethrough. Thus, each external instruction is fetched to the instruction decoder 25 through the first port group during the first operation cycle OP$_1$.

When one of the second control pulses M$_2$ is produced by the clock distributor 23 after the above-described one first control pulse M$_1$, the additional multiplexer 62 selects the higher significant half bits of each address signal given from the internal program counter 61. The selected higher significant half bits of each address signal are sent from the additional multiplexer 62 through the address/instruction bus 45 to the first port controller 41 enabled by the above-mentioned one second control pulse M$_2$, as shown in FIG. 5. Thus, the selected higher significant half bits are allotted to the first port group 16 to be sent to the external device during the second operation cycle OP$_2$.

Subsequently, the additional multiplexer 62 selects the lower significant half bits of each address signal in response to one of the third control pulses M$_3$ following the above-specified one second control pulse M$_2$. The selected lower significant half bits are distributed to the first port group 16 through the address/instruction bus 45 and the first port controller 41 enabled by each of the third control pulses M$_3$ during the third operation cycle OP$_3$, as shown in FIG. 5.

Thus, the first through the third control pulses M$_1$ to M$_3$ can be divided into the first control pulses M$_1$ for each external instruction and a pair of the second and the third control pulses M$_2$ and M$_3$ for each address signal. Therefore, the first control pulses M$_1$ may be referred to as a first timing signal while the second and the third control pulses M$_2$ and M$_3$, as a second timing signal.

Let the microcomputer be in the slave mode in which each external instruction is given through the third port group 18. In this event, the third port controller 18 is enabled by each of the first control pulses M$_1$, like the first port controller 16. However, each address signal need not be sent through the third port group 18 in the slave mode because each address signal is delivered from the microcomputer put into the master mode. The third port controller 43 is therefore disabled during the second and the third operation cycles OP$_2$ and OP$_3$ by the second and the third control pulses M$_2$ and M$_3$. Specifically, the third port controller 18 is put into a high impedance state.

In addition, the second and the fourth port controllers 42 and 44 may not be controlled in a time division fashion by the first through the third control pulses M$_1$ to M$_3$. The remaining operation is similar to that described with reference to FIG. 2 and will therefore be described no longer.

Figure 6:
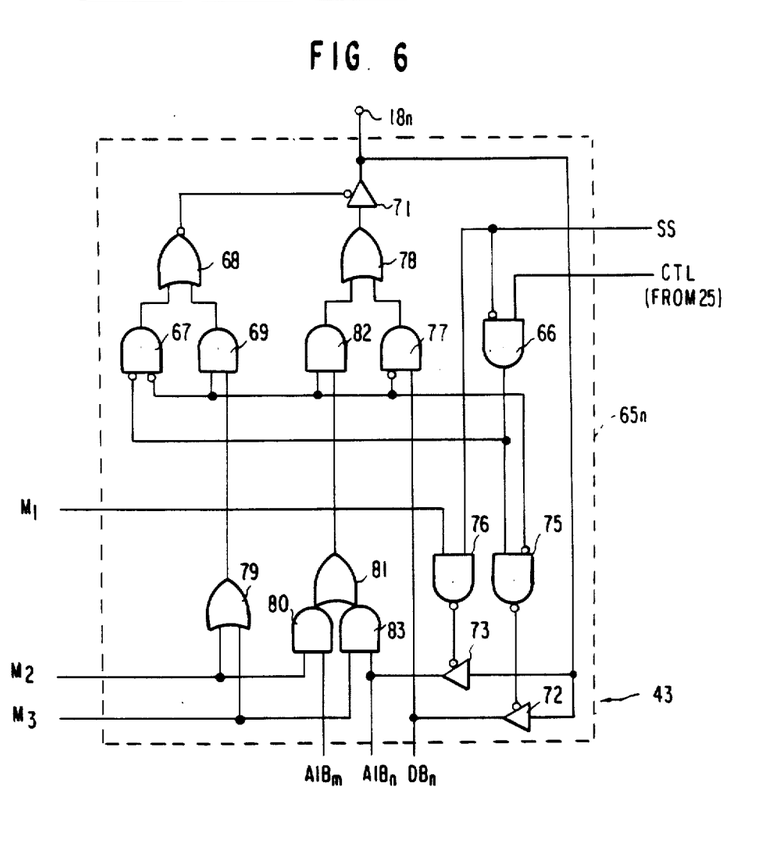
FIG. 6 shows a block diagram of the one of port controllers that is illustrated in FIG. 5.

Referring to FIG. 6, a third port controller 43 is for use in the microcomputer 10 illustrated in FIG. 4 and comprises a plurality of logic circuits, one of which is shown at 65$_n$ in FIG. 6. The number of the logic circuits is equal to the number of bits transferred through the third port group 18. In the normal and the master modes, a first gate 66 is enabled in the absence of the slave mode signal SS given from the clock distributor 23. Let the illustrated logic circuit 65$_n$ be supplied with a high level, namely, a logic "1" level as a third port control signal CTL from the instruction decoder 25. In this event, the logic "1" level is produced through second and third gates 67 and 68 with a fourth gate 69 disabled. Responsive to the logic "1" level, a first three-state buffer 71 is rendered into a high impedance state. As a result, an input terminal of the three-state buffer 71 is electrically isolated from an output terminal thereof, in the manner known in the art. That port of the third port group 18 which is indicated at 18$_n$ is connected to second and third three-state buffers 72 and 73 controlled by fifth and sixth gates 75 and 76, respectively.

The third three-state buffer 73 and the sixth gate 76 will be described later.

The fifth gate 75 which is connected to the first gate 66 and responsive to the slave mode signal SS supplies the low level, namely, logic "0" level, to the second three-state buffer 72 in each of the normal and the master modes. Thus, the second three-state buffer 72 becomes a low impedance state and the illustrated port $18_n$ is connected to one line of the internal data bus that is depicted at $DB_n$. From this fact, it is readily understood that the port $18_n$ serves as an input port for transferring data from the port $18_n$ to the one data line $DB_n$.

In each of the normal and the master modes, it is assumed that the third port control signal CTL takes the logic "0" level. In this case, the second three-state buffer 72 becomes the high impedance state because the fifth gate 75 produces the logic "1" level. On the other hand, the first three-state buffer 71 is supplied with the logic "0" level through the second and the third gates 67 and 68 and put into the low impedance state. A seventh gate 77 which is connected to the one data line $DB_n$ is given the logic "0" level as the slave mode signal SS. The one data line $DB_n$ is connected to the port $18_n$ through the seventh gate 77 and an eighth gate 78 to transfer data from the one data line $DB_n$ to the port $18_n$. Consequently, the port $18_n$ is operable as an output port.

Let the slave mode signal SS of the logic "1" level be given to the illustrated logic circuit $65_n$. In the slave mode, the second three-state buffer 72 is supplied with the logic "1" level through the first and the fifth gates 66 and 75 and is put into a high impedance state. The seventh gate 77 is disabled in the presence of the slave mode signal SS. Thus, the one data line $DB_n$ is isolated from the port $18_n$.

Under the circumstances, it is surmised that a specific one of the first control pulses $M_1$ is given to the sixth gate 76 so as to put the third three-state buffer 73 into a low impedance state. As a result, the port $18_n$ is connected through the third three-state buffer 73 to a specific one line of the address/instruction bus that is depicted at $AIB_n$ and that is for transferring one of the lower significant half bits of each address signal during presence of the specific first control pulse $M_1$. Therefore, one bit of each external instruction can be transferred from the port $18_n$ to the specific line $AIB_n$.

When a specific one of the second control pulses $M_2$ follows the specific first control pulse $M_1$ in the slave mode, the first three-state buffer 71 is given the logic "0" level through a ninth gate 79, the fourth gate 69, and the third gate 68 and put into the low impedance state. A tenth gate 80 is enabled by the specific control pulse $M_2$. The tenth gate 80 is connected to a particular line of the address/instruction bus that is indicated at $AIB_m$ and that is for transferring a particular one of the higher significant half bits. Therefore, the particular one bit is sent to the port $18_n$ through the tenth gate 80, an eleventh gate 81, a twelfth gate 82, the eighth gate 78, and the first three-state buffer 71 during presence of the specific second control pulse $M_2$.

Likewise, the specific one bit is sent from the specific line $AIB_n$ of the address/instruction bus to the port $18_n$ through a thirteenth gate 83, the eleventh, the twelfth, and the eighth gates 81, 82, and 78, and the first three-state buffer 71.

Although the third port controller 43 exemplified in FIG. 6 produces each address signal in the slave mode, each address signal may be suppressed in the debug mode by the third port controller 43, if the first port controller 41 produces each address signal, as described in conjunction with FIG. 4.

The first port controller 41 is similar to the third port controller 43 illustrated in FIG. 6 except that the master mode signal MS is given to the first port controller 41 instead of the slave mode signal SS.

Figure 7:
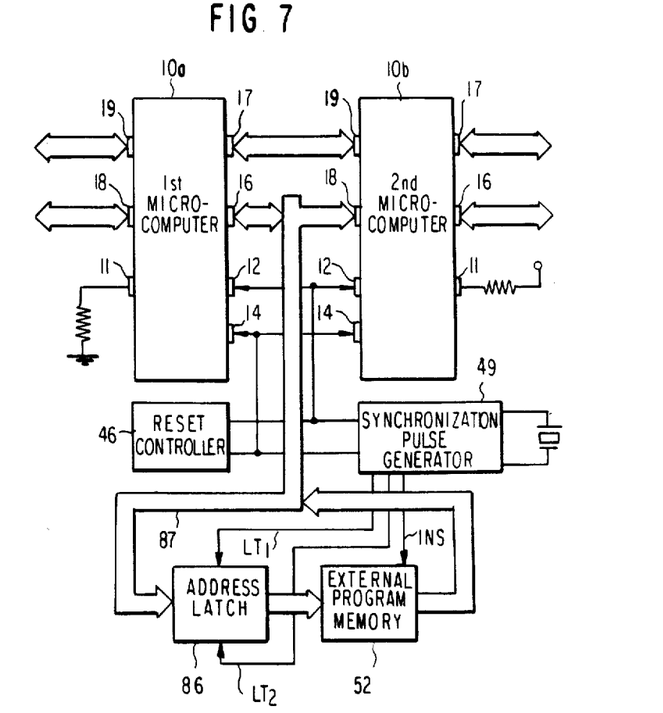
FIG. 7 shows a block diagram for use in describing a debugging method carried out by the use of a pair of microcomputers, each being illustrated in FIG. 5.

Referring to FIG. 7, description will be made as regards a method of debugging an external program by the use of first and second microcomputers, each of which is identical with that illustrated with reference to FIG. 4 and both of which are depicted at 10a and 10b, respectively. The first and the second microcomputers 10a and 10b are to be put into the master and the slave modes because the low and the high levels are given to the first input terminals 11 of the first and the second microcomputers 10a and 10b in the manner similar to that illustrated in FIG. 3. Similarly, the remaining terminals and ports are connected to an external device like in FIG. 3. The external device is similar to that illustrated in FIG. 3 except that an address latch 86 cooperates with the first and the second microcomputers 10a and 10b, the synchronization pulse generator 49, and the external program memory 52 and the external program counter 51 and the external instruction decoder 54 are removed from FIG. 7.

When each level signal terminal 14 of the first and the second microcomputers 10a and 10b is supplied with the minus level (−) in synchronism with the synchronization pulses, as mentioned in conjunction with FIG. 3, the first and the second microcomputers 10a and 10b are put into the master and the slave modes, in the manner described in FIG. 3, respectively. Each of the first and the second microcomputers 10a and 10b produces the first through the third control pulses $M_1$ to $M_3$ for use therein in timed relation to the synchronization pulses.

Let no instruction be initially supplied to the first and the second microcomputers 10a and 10b during an initial one of the first operation cycles $OP_1$ (FIG. 5) because no address signal is latched in the address latch 80. The synchronization pulse generator 49 sends first and second latch signals $LT_1$ and $LT_2$ to the address latch 86. The first latch signal $LT_1$ is for making the address latch 86 keep the higher significant half bits of each address signal during each second operation cycle $OP_2$. Each second operation cycle $OP_2$ is divisible into the first and the second halves. The first latch signal $LT_1$ is produced during the second half of each second operation cycle $OP_2$. Similarly, the second latch signal $LT_2$ is for making the address latch 86 set the lower significant half bits of each address signal during the second half of each third operation cycle $OP_3$. The address latch 86 latches an address signal from an external address/instruction bus 87 in synchronism with the first and the second latch signals $LT_1$ and $LT_2$ to supply the latched address signal to the external program memory 52. Supplied with an instruction input signal INS given from the synchronization pulse generator 49 during the succeeding first operation cycle $OP_1$, the external program memory 52 reads an external instruction out of an address indicated in the external program memory 52 by the address signal. The external instruction read out of the external program memory 52 is delivered through the external address/instruction bus 87 to the first and the second microcomputers 10a and 10b.

Let the external instruction be for loading the random access memory 34 (FIG. 5) with data through the first port group of one of the first and the second microcomputers 10a and 10b. The data in question are given through the first port group 16 of the second microcomputer 10b and are sent through the fourth port group 19 of the second microcomputer 10b and the second port group 17 of the first microcomputer 10a to the random access memory 34 of the first microcomputer 10a.

Alternatively, let the external instruction be for moving data from the random access memory 34 to the first port group 16 of one of the first and the second microcomputers 10a and 10b. The data under consideration are read out of the random access memory 34 of the first microcomputer 10a to be sent through the second port group 17 of the first microcomputer 10a and the fourth port group 19 of the second microcomputer 10b to the first port group 16 of the second microcomputer 10b.

Such operation is similar to the method described in conjunction with FIG. 3.

Anyway, operations of the first and the second port groups 16 and 17 are switched from one to another in the master mode with operations of the third and the fourth port groups 18 and 19 kept unchanged while operations of the third and the fourth port groups 18 and 19 are switched from one to another in the slave mode with operations of the first and the second port groups 16 and 17 kept unchanged. This is similar to the operations described with reference to FIG. 3.

Figure 8:
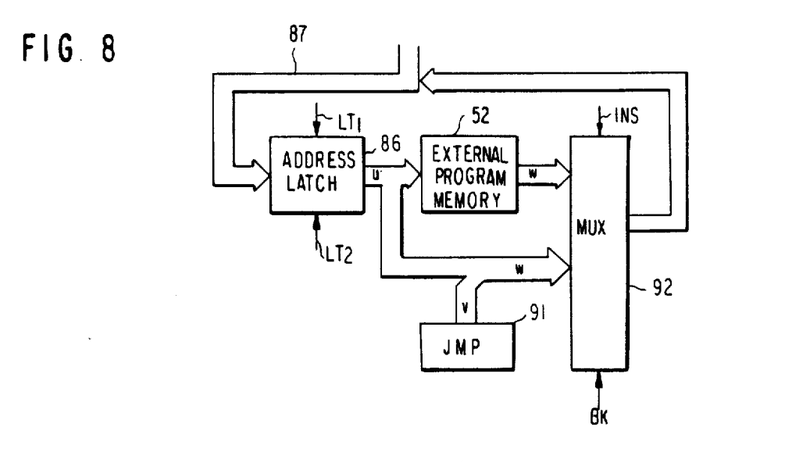
FIG. 8 shows a block diagram for use in describing another method which can be carried out by the use of the microcomputers illustrated in FIG. 5, with the microcomputers omitted from FIG. 8.

Referring to FIG. 8, an external device comprises a jump code generator (JMP) 91 and a multiplexer 92 in addition to the address latch 86 and the external program memory 52 both of which are similar to those illustrated in FIG. 7. The illustrated external device can carry out break operation for temporarily interrupting, during debug operation, an external program which is being executed and stepwise advancing operation for stepwise executing each external instruction.

More specifically, the illustrated address latch 86 delivers each address signal of u bits to the external program memory 52. Each address signal is sent to the multiplexer 92 in parallel to a jump code of v bits produced by the jump code generator 91. A sum of the u and v is equal to the number of bits of each external instruction, namely, w. Inasmuch as each address signal specifies a present address of the external program memory 52, a combination of the jump code and each address signal specifies a specific jump instruction of jumping to present address. Thus, the multiplexer 92 is supplied with each external instruction and the specific jump instruction in parallel.

The multiplexer 92 is controlled by the instruction input signal INS given from the synchronization pulse generator 49 (FIG. 7) and by a break request signal BK produced so as to interrupt execution of the external program. In the absence of the instruction input signal INS, the multiplexer 92 is put in a high impedance state and, therefore, allows no instruction to pass therethrough.

Let the instruction input signal INS be given from the synchronization pulse generator 49 to the multiplexer 92 in the absence of the break request signal BK. In this event, each external instruction given from the external program memory 52 is selected by the multiplexer 92 to be sent to the external address/instruction bus 87. As a result, the first and the second microcomputers 10a and 10b are operated in compliance with each external instruction.

On the other hand, let the break request signal BK be given to the multiplexer 92 during presence of the instruction input signal INS. The specific jump instruction is selected by the multiplexer 92 in response to the break request signal BK and the instruction input signal INS and is sent to the external address/instruction bus 87. Inasmuch as the specific jump instruction is representative of jump to present address, as mentioned before, the specific jump instruction is repeatedly carried out by each of the first and the second microcomputers 10a and 10b. In other words, it is apparently seen as if operation was standstill or suspended at a present address appearing on arrival of the break request signal BK.

It is readily possible to stepwise advance the external program by enabling or disabling the break request signal BK in synchronism with a sequence of external clock pulses.

With the method illustrated with reference to FIG. 8, it is possible to carry out the break operation and the stepwise advancing operation without including in each microcomputer any internal circuit which is used in the debug mode alone and which is unnecessary in the normal mode. This enables a reduction of a chip area. Inasmuch as costs of each microcomputer are dependent on a chip area of each microcomputer, such a reduction of a chip area makes each microcomputer cheap.

Anyway, each microcomputer 10a and 10b has no extra terminal used only in the debug mode, as readily understood from FIG. 7, and a high availability to terminals, like each microcomputer $10_1$ and $10_2$ illustrated in FIG. 3.

While this invention has thus far been described in conjunction with a few embodiments thereof, it will readily be possible for those skilled in the art to put this invention into practice in various other manners. For example, the level signal given from the reset controller 46 (FIGS. 3 and 7) may be supplied to another terminal different from the level signal terminal 14 which is for use in resetting each microcomputer. Each external instruction may be supplied to each microcomputer in a bit series fashion. On developing a new program in the manner described in conjunction with FIG. 3, the second port group 17 of the first microcomputer and the fourth port group 19 of the second microcomputer may be observed in order to monitor an internal state of each microcomputer. More than two microcomputers may be combined together in order to debug an external program. For example, the number of the microcomputers be equal to three. In this event, one of the microcomputers alone is in a master mode of operation while the remaining computers are in first and second slave modes of operation different from each other. In each microcomputer, one of port groups may be used as an instruction input port group and two of port groups may be used as data transfer buses.

What is claimed is:

1. A single chip microcomputer selectively operable in a normal and a debug mode in response to internal and external instructions, respectively, said external instructions being given from at least one external device, said microcomputer comprising:
a program memory for storage of a program consisting of said internal instructions;
principal mode signal producing means for selectively producing a normal and a debug mode signal representative of said normal and said debug modes, respectively;

a predetermined number of port groups comprising a first, a second, a third, and a fourth group of ports;

subsidiary mode signal producing means coupled to said principal mode signal producing means for producing a first and a second subsidiary mode signal representative of first and second subsidiary modes, respectively, only when said subsidiary mode signal producing means is supplied with said debug mode signal from said principal mode signal producing means;

decoding means coupled to said program memory and said principal and said subsidiary mode signal producing means for decoding said external instructions to produce a first and a second set of control signals in response to said first and said second subsidiary mode signals, respectively, and for decoding the internal instructions produced by said program memory to produce a third set of control signals when said decoding means is supplied with said normal mode signal from said principal mode signal producing means; and selectively operable port control means between said first through said fourth groups of ports and said decoding means for putting said first through said fourth groups of ports into operation in said normal mode in response to said third-set control signals, for allotting, in response to said first-set control signals, said external instructions and a specific one of data sets related to said external instructions to said first and said second groups of ports, respectively, and for allotting, in response to said second-set control signals, said external instructions and a particular one of the data sets to said third and said fourth groups of ports, respectively.

2. A single chip microcomputer as claimed in claim 1, wherein said decoding means comprises:

means responsive to said first subsidiary signal for producing said first-set control signals to allot said specific data set to said second group of ports even when each of said external instructions is given through said first group of ports to indicate operation of said first group of ports; and means responsive to said second subsidiary signal for producing said second-set control signals to couple said fourth group of ports to said first and said second groups of ports in carrying out transmission of said particular data set between said fourth group of ports and each of said first and said second group of ports only when each external instruction is given through said third group of ports to indicate operation of said first and said second groups of ports.

3. A single chip microcomputer as claimed in claim 1, further comprising:

address producing means coupled to said program memory and operable in each of said normal and said debug modes for producing a succession of address signals each of which specifies each address assigned to said internal and said external instructions;

timing signal generating means coupled to said principal mode signal producing means and responsive to said debug mode signal for generating a first timing signal defining a first succession of time intervals with a predetermined period to be allotted to said external instructions and a second timing signal which defines a second succession of time intervals interspersed between said time intervals and which are allotted to said address signal succession; and delivering means coupled to said subsidiary mode signal producing means and responsive to said second timing signal for delivering said address signal succession to said first group of ports in response to said first subsidiary mode signal, said address signal being intercepted by said delivering means in response to said second subsidiary mode signal;

said port control means comprising:

means responsive to said first subsidiary mode signal for allowing each of said external instructions and each of said address signals to pass therethrough during said first and said second succession of time intervals in a time division fashion, respectively; and means responsive to said second subsidiary mode signal for allowing each of said external instructions to pass therethrough during said first succession of time intervals.

* * * * *

UNITED STATES PATENT AND TRADEMARK OFFICE
CERTIFICATE OF CORRECTION

PATENT NO. : 4,670,838
DATED : June 2, 1987
INVENTOR(S) : KAWATA

It is certified that error appears in the above-identified patent and that said Letters Patent is hereby corrected as shown below:

| | |
|---|---|
| COLUMN 3, LINE 13 | After the first occurrence of "of" delete "the", insert --the-- after second occurrence of "of". |
| COLUMN 3, LINE 53 | After "resonater" insert --,-- |
| COLUMN 4, LINE 5 | Delete "10" insert --16-- |
| COLUMN 4, LINE 27 | Delete "20" insert --26-- |
| COLUMN 4, LINE 29 | Delete "22" insert --29-- |
| COLUMN 6, LINE 14 | Delete "10" insert --16-- |
| COLUMN 6, LINE 37 | Delete "10" insert --16-- |
| COLUMN 7, LINE 62 | Delete "10" insert --19-- |
| COLUMN 8, LINE 65 | Delete "tions," |
| COLUMN 14, LINE 41 | Delete "80" insert --86-- |

Signed and Sealed this

Second Day of August, 1988

Attest:

DONALD J. QUIGG

Attesting Officer      Commissioner of Patents and Trademarks